July 5, 1949.  H. S. JACOBS  2,475,140
REGULATING GENERATOR
Filed Oct. 30, 1944  4 Sheets-Sheet 1

INVENTOR.
Henry S. Jacobs
BY David G. Fox
ATTORNEY.

July 5, 1949.　　　　H. S. JACOBS　　　　2,475,140
REGULATING GENERATOR

Filed Oct. 30, 1944　　　　4 Sheets-Sheet 2

INVENTOR.
Henry S. Jacobs
BY
David A. Fox
ATTORNEY.

July 5, 1949.    H. S. JACOBS    2,475,140
REGULATING GENERATOR
Filed Oct. 30, 1944    4 Sheets-Sheet 4

INVENTOR.
Henry S Jacobs
BY
David A. Fox
ATTORNEY.

Patented July 5, 1949

UNITED STATES PATENT OFFICE 2,475,140

REGULATING GENERATOR

Henry S. Jacobs, Milwaukee, Wis., assignor to Harnischfeger Corporation, Milwaukee, Wis., a corporation of Wisconsin Application October 30, 1944, Serial No. 561,098

9 Claims. (Cl. 322—52)

This invention relates to electrical means for transmitting and controlling the transmission of mechanical power and resides in a system including a direct current electric generator of special design adapted to be driven by a source of mechanical energy electrically connected with a direct current electric motor for delivery of mechanical power at the point desired. In the transmission of this invention the generator is of a specialized character in that it includes a field structure and means for energizing the same which regulates the generator output in accordance with changes in the load imposed upon the motor with a minimum of harmful transients and with a promptness heretofore unattainable, all while utilizing field currents of such small magnitude that the same may be easily interrupted or regulated to control the power transmitted.

Heretofore in the art extensive use has been made of systems for transmission and control of mechanical energy which employ an electric generator electrically connected to an electric motor. Such systems enjoy their popularity for the reason that the main load current need not be interrupted to control the transmission of power. Instead interruption or control of the relatively smaller currents of the field windings of the generator, accomplishes the result desired. The capability is of particular importance where the load is intermittent, involving frequent starting, stopping and reversing. One application for such transmissions of particular usefulness, is that of electrically-driven excavating machines. In this case the highly variable and unpredictable nature of the load is such that the transmission system, including generator and motor, must be self-protecting in its nature. An effort to include this self-protecting property in the transmission has been made by providing the generator with a separately-excited field, a self-excited shunt field and a differential series field. This arrangement is open to objection for the reason that much magnetic energy is storable in such an extensive field structure and this energy must be stored or discharged before a major regulating adjustment can take place in the system. As a result large electrical disturbances harmful to good commutation and large mechanical disturbances harmful to the windings of the system itself as well as to the appliance served are encountered.

An additional objection to the systems heretofore in use in excavator work is the relatively large field currents which must be employed because of the differential or "bucking" fields. With the amount of power required in large excavators these field currents are too large to be switched by ordinary commutator or drum switches and bulky, expensive, magnetic contactors must be installed to handle the same. Furthermore the scope of accommodation to variable load conditions of such generators as have heretofore been employed has been limited. One way of attempting to overcome these deficiencies which has been resorted to has been to employ a plurality of separately excited field windings for the generator and to supply one or more of said field windings with current from its own separate exciter. In this case the field current of the exciter rather than the main generator is low enough to be controlled by simple drum or commutation switches. In a system such as this, exciter characteristics may also be provided which increase the scope of accommodation of the main generator to the variable loads imposed thereon. Such an elaborated system is bulky, complex and expensive to install and maintain, and is also inherently slow to adjust itself to sudden load changes and therefore suffers the attendant electrical and mechanical shocks already referred to.

Through the present invention, a transmission system having inherent self-protecting properties is provided, that is to say, total power output and current are definitely limited so that the motor can be stalled and will refuse a destructive load without harm. At the same time, this is accomplished without the use of a differential series field winding in the generator and as a consequence the self-inductance of the entire field structure is markedly reduced, eliminating much of the harmful transients which would otherwise occur at the moment of adjustment to sudden load changes. Furthermore, the magnitude of field currents required is so greatly diminished that simple switches may be used to control a transmission of very large power output. In this invention this is accomplished by providing a generator field structure, the effective flux of which is altered in response to armature voltage changes and armature reaction only, without dependence upon a differential series field winding. Not only is the effective flux of the field structure of this invention made responsive to armature voltage, but such responsiveness is brought about in large measure by diversion of a maintained flux rather than by creation and extinction of flux thus eliminating the shocks attendant upon practically instantaneous discharge of magnetic energy thru the generator armature at the moment of a major load adjustment.

The transmission of this invention includes the further improvement of a generator field structure which offsets field flux displacement by armature reaction to such an extent that brushes may be shifted over a considerable range of angular adjustment to modify the generator characteristic while preserving good commutation. Because of this, maximum current output of the generator can be steplessly adjusted by brush shifting without any material change in the maximum power transmittable by the transmission. This is in part accomplished by increasing the air gap and therefore its reluctance over the trailing portions of the field pole pieces and in part by the flux return path thru which field flux is diverted for other purposes already explained. The ability to steplessly regulate the maximum current output without disarrangement of the other characteristics of the transmission is of importance, since the behavior thereof while accelerating, decelerating and plugging can be nicely adjusted to the requirements of the particular appliances served.

This invention is herein described in greater particularity by reference to the accompanying drawings which form a part hereof and in which there is set forth by way of illustration and not of limitation specific forms in which this invention may be embodied.

Figure 6:
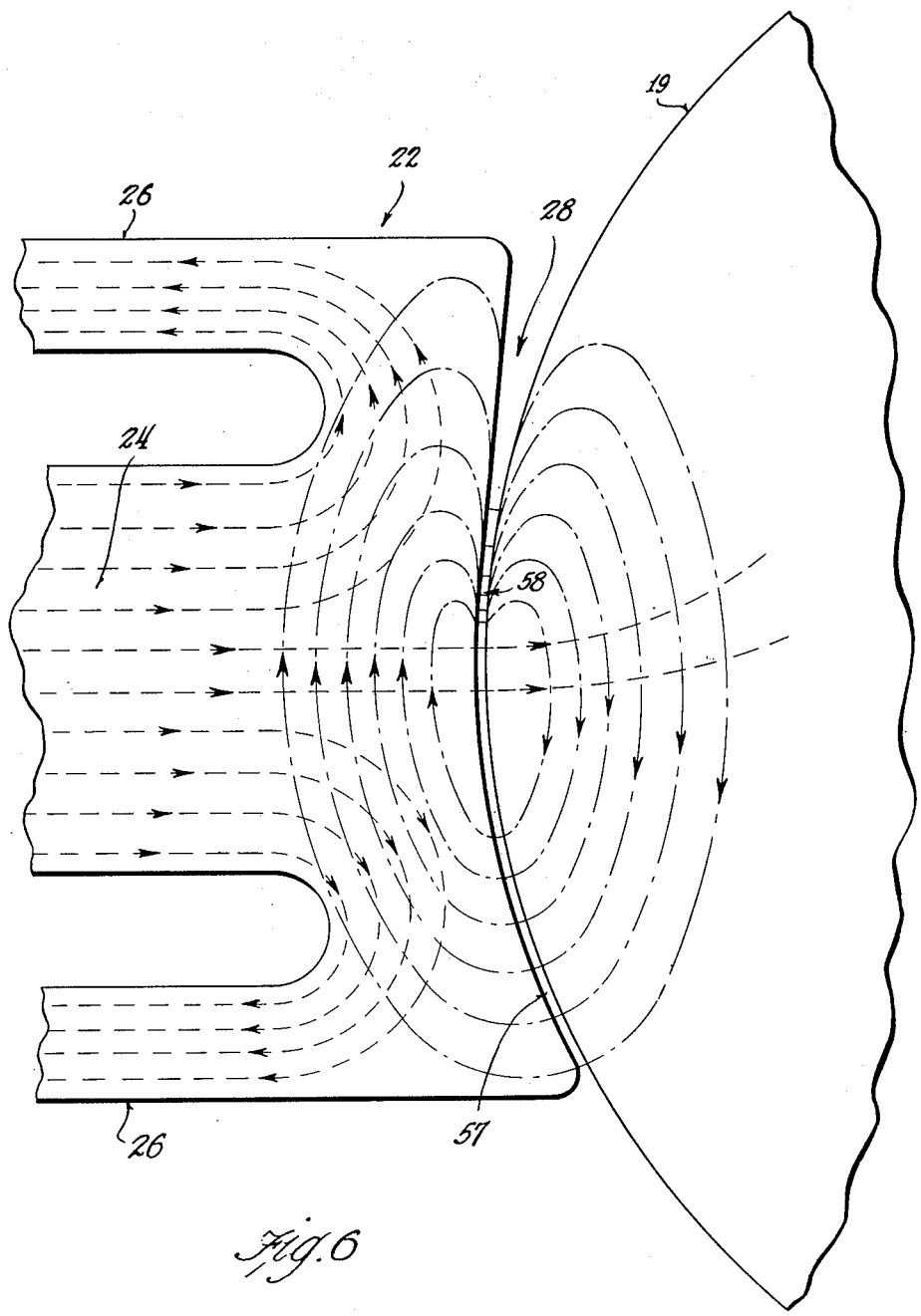
Figure 7:
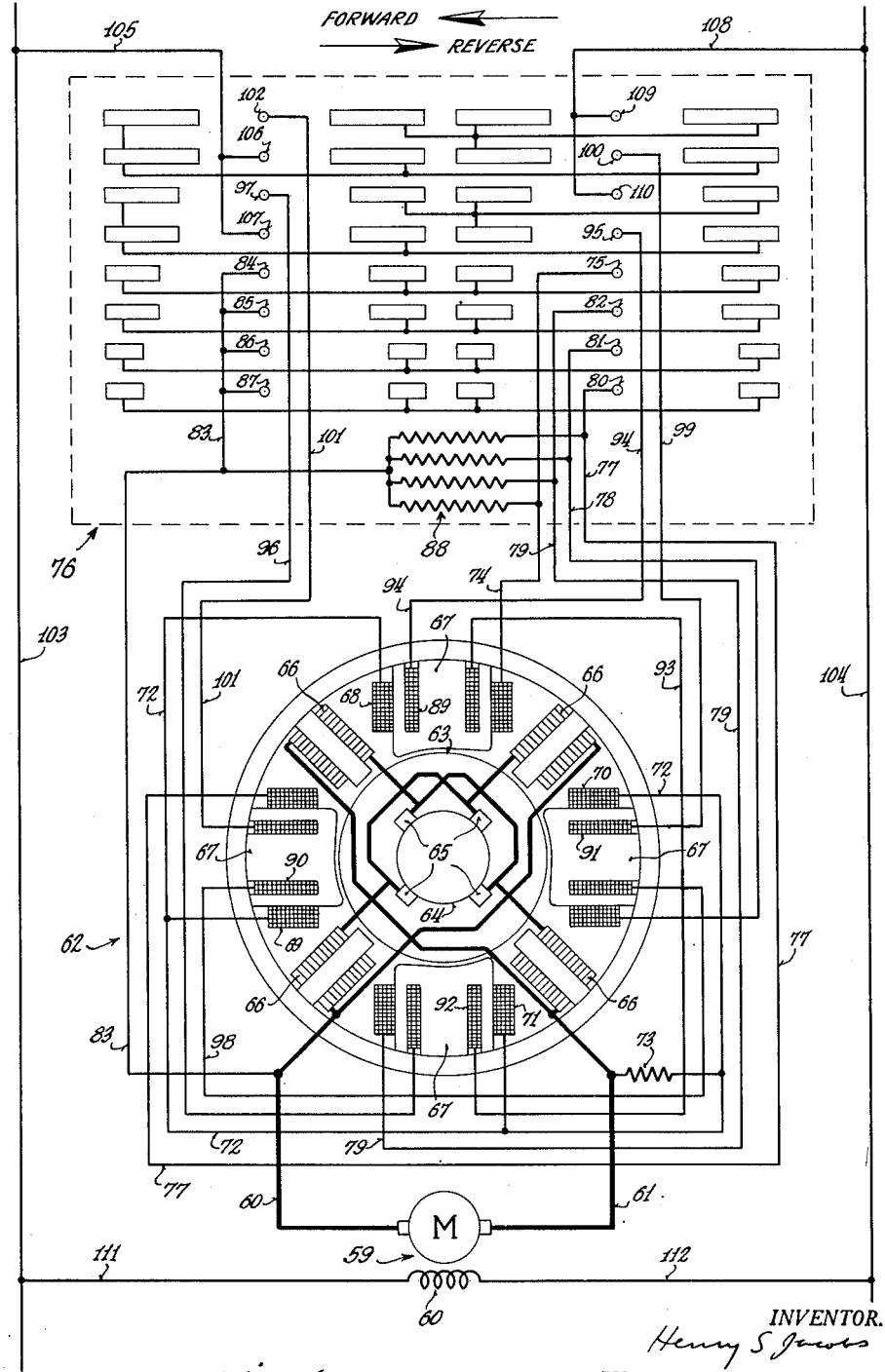

Fig. 6 is an enlarged simplified diagram of part of a pole piece of a generator of a transmission of this invention showing roughly the manner in which amature reaction flux under heavy load acts in conjunction with the field structure to contribute to the diversion of flux into the return bridges and away from the armature while at the same time scope is left for shifting of brushes without loss of good commutation; and Fig. 7 is a circuit diagram for a more elaborate transmission of this invention in which a four pole generator is employed.

Figure 1:
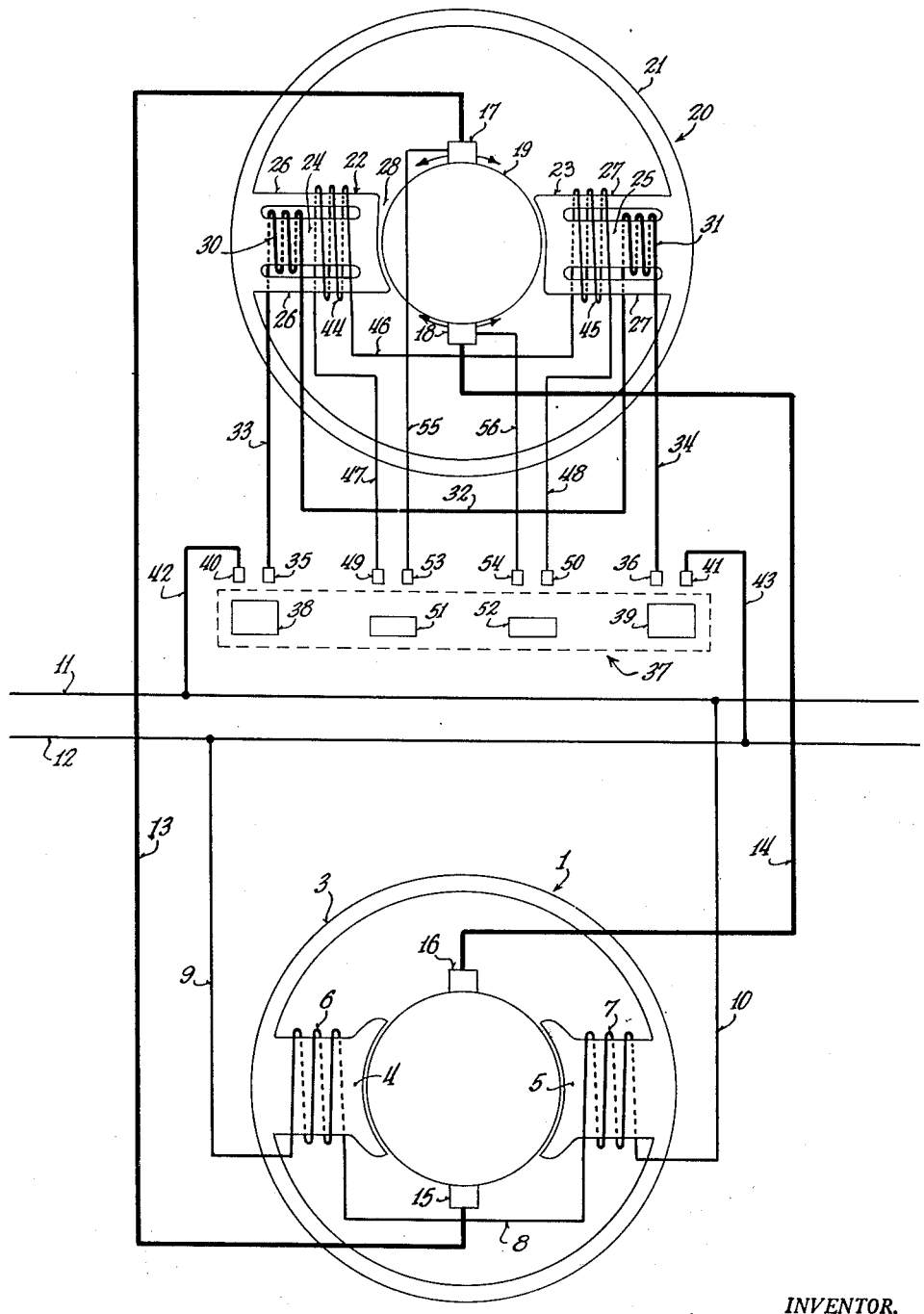
Fig. 1 is a diagrammatic showing of the circuit of a transmission of this invention in simplified form.

Referring now to the drawings, there is shown in Fig. 1 a motor 1 having an armature and commutator 2 of conventional form and therefore only diagrammatically indicated, and a field frame 3 having pole pieces 4 and 5 provided respectively with field windings 6 and 7. Windings 6 and 7 are joined by the conductor 8 and are connected at their outer ends by the conductors 9 and 10 with a source of direct current furnished thru the excitation supply leads 11 and 12. The motor 1 is supplied with power for driving the same through power leads 13 and 14 which are connected with brushes 15 and 16 in engagement with the commutator of the armature 2.

The power leads 13 and 14 receive their power by connection with brushes 17 and 18 which engage the commutator of armature 19 of a generator designated generally by the numeral 20. The generator 20 is provided with a field frame 21 having pole pieces 22 and 23 which are of a specialized configuration.

Each of the pole pieces 22 and 23 is provided with a main central pole piece portion 24 and 25 flanked on either side by return path bridges 26 and 27 formed of the same magnetic material as the pole pieces. The return path bridges 26 and 27 are joined to the respective central pole piece portions 24 and 25 at their inner ends while magnetic communication between the bridges and the central portions is also provided at their outer ends where the same join with the generator frame 21. The pole face portions 28 and 29 of the pole pieces 22 and 23 are not concentric with the armature 19 but are cut away so as to provide an air gap of considerably increased dimensions on the trailing sides of said pole pieces 22 and 23.

The return path bridges 26 and 27 are of a cross section considerably smaller than that of the main central pole piece portions 24 and 25 so as to possess a considerably higher reluctance than that of the main central pole piece portions 24 and 25. If for mechanical reasons it is desired to make the bridges 26 and 27 of more substantial dimension, the desired reluctance may be obtained by introducing an air gap or its equivalent. Surrounding the main center pole piece portions 24 and 25 are windings 30 and 31 which are intended to serve as separately excited field windings. The windings 30 and 31 are joined by a conductor 32 while the outer ends thereof are joined by conductor 33 and 34 with stationary contacts 35 and 36 of a controller 37. Stationary contacts 35 and 36 are positioned to be engaged by controlled segments 38 and 39 which in turn are positioned to engage stationary contacts 40 and 41 which are joined by conductors 42 and 43 with exciter current line leads 11 and 12. When the controller 37 is shifted to energize the windings 30 and 31, flux is created in the main center pole piece portions 24 and 25 which may pass either thru the armature 19 or thru the return path bridges 26 and 27, depending upon circumstances to be more fully described in detail hereinafter.

Completely surrounding the entire pole piece 22 is a winding 44 while a similar winding 45 completely surrounds the pole piece 23. Windings 44 and 45 are joined by a conductor 46 and their outer ends are connected by conductors 47 and 48 with stationary contacts 49 and 50 of the controller 37. Movable segments 51 and 52 are located on a controller 37 to engage the stationary contacts 49 and 50 and to also engage the stationary contacts 53 and 54 which are joined respectively by conductors 55 and 56 with the brushes 17 and 18 of the generator 20. The windings 44 and 45 thus constitute self-excited field windings for the generator 20 and serve to create a flux both in the main central portions 24 and 25 as well as in the return bridge portions 26 and 27 of the pole pieces 22 and 23, under the conditions to be more fully described in detail hereinafter.

Figure 2:
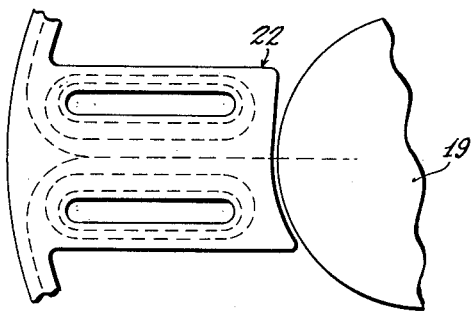
Fig. 2 is a simplified illustrative diagram of one pole piece of a generator of a transmission of this invention when the motor is stalled to illustrate the disposition of generator field flux under this condition, without showing armature reaction flux which acts to a very material extent to bring about the flux disposition illustrated.

The transmission above described is arranged so that the generator 20 is driven preferably at constant speed by any suitable source of mechanical power while the motor 1 is connected with any mechanical appliance which is to be driven. Assuming the motor 1 to be stationary and joined with a load to be accelerated, movement of controller 37 will bring about a supply of excitation current from leads 11 and 12 to the windings 30 and 31. The flux which is thus created will be transmitted thru the armature 19 in part and thru the return bridges 26 and 27 in part in a manner roughly indicated in Fig. 2. Continued movement of the controller 37 will result in the joining of windings 44 and 45 with the generator brushes 17 and 18, but under this circumstance and with the motor 1 stalled, generator voltage will be low and little current will flow in the windings 44 and 45. The flux distribution under these circumstances will still be roughly as represented in Fig. 2 and even tho the back E. M. F. of the motor 1 is practically zero, the current output of the generator 20 is kept within safe limits by the very moderate amount of flux which passes thru the armature 19.

Figure 3:
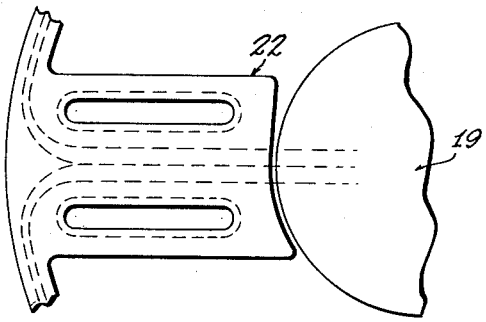
Fig. 3 is a simplified illustrative diagram of one pole piece of a generator of a transmission of this invention with the motor under heavy load at low speed to illustrate the disposition of generator field flux under this condition, without showing armature reaction flux which acts to some extent to bring about the flux disposition illustrated.
Figure 4:
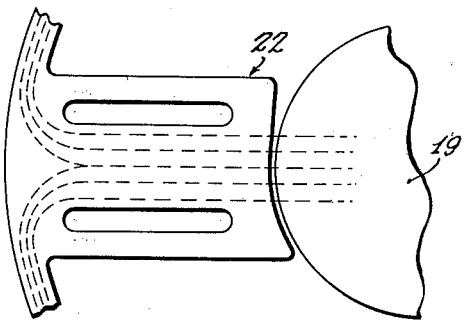
Fig. 4 is a simplified illustrative diagram of one pole piece of a generator of a transmission of this invention when the motor is operating at rated speed and rated load to illustrate the disposition of generator field flux under this condition, without showing armature reaction flux which acts in smaller extent to bring about the flux disposition illustrated.

If the torque of the motor 1 is sufficient to overcome the load imposed upon it, motor 1 will start and will accelerate and in doing so, its back E. M. F. will increase and the voltage of generator 20 will increase accordingly. When this occurs, the excitation of windings 44 and 45 increases, creating a flux in opposition to that which has been returning thru the bridge paths 26 and 27. This brings about a change in the distribution of flux in the pole pieces 22 and 23 so that a condition roughly illustrated by Figure 3 is brought about. That is to say, part of the flux which previously had returned thru the bridge paths 26 and 27 is now diverted into the armature 19. As the motor 1 continues to increase its speed, the excitation of windings 44 and 45 continues to increase until the state roughly indicated in Fig. 4 is reached, in which no flux returns thru the bridge paths 26 and 27 and all of the flux passing thru the main central pole piece portion 24 and 25 passes thru the armature 19. It is preferred that the windings 44 and 45 and the windings 30 and 31 and the physical dimensions of the parts forming the magnetic circuit be so proportioned to one another and to the remaining parts of the transmission as a whole that the condition illustrated in Fig. 4, prevails when the motor 1 is opererating in such a manner that the product of its speed and torque is a maximum. This relationship is preferred because the flux condition illustrated in Fig. 4, is the one which is most highly responsive and it is desirable that this maximum responsiveness be available to avoid the injurious effects of sudden load changes when the maximum power output of the transmission is being delivered.

Figure 5:
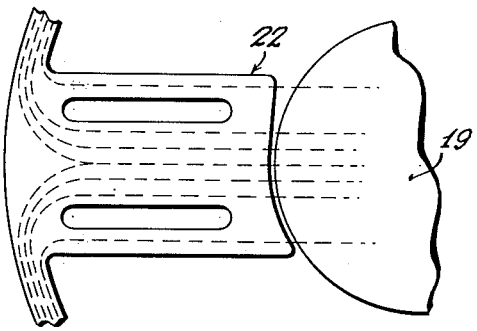
Fig. 5 is a simplified illustrative diagram of one pole piece of a generator of a transmission of this invention when the motor is running at maximum speed without load to illustrate the disposition of generator field flux under this condition, without showing armature reaction flux which is too small to materially affect the flux disposition illustrated.

If the motor 1 is relieved of its load and allowed to accelerate beyond normal rated speed, the excitation of windings 44 and 45 still further increases until an actual reversal in flux in the return bridge paths 26 and 27 takes place so that flux passing therethru actually enters the armature 19, as roughly illustrated in Fig. 5. In this way the no load voltage of the generator 20 is further increased. When motor 1, lightly loaded and running at high speed, is subjected to load, causing deceleration, a sequence which is the reverse of that which has been described takes place so that the motor 1 can be stalled without damage because the low flux condition illustrated in Fig. 2 will become reestablished.

In order that the sequence of events above described shall take place more nearly free of the effect of armature reaction, the pole pieces 22 and 23 are cut away as at 28 and 29 on the trailing portions thereof. When this is done, displacement of the field by armature flux in the form of the cross-magnetizing effect is discouraged. Not only is displacement of the field discouraged, but the tendency of the field with heavy armature current flowing to attempt to utilize the increased air gaps 28 and 29 will result in an even greater reduction in flux passing thru the armature 19 than would be accounted for by the simple explanation which has been given in connection with Figs. 2 to 5 inclusive. Without offering the same as more than a very rough approximation of the way this effect is brought about, Fig. 6 is here presented showing how flux in the main central pole piece portion 24 is further encouraged to return thru the bridge path 26 by the presence of the enlarged air gap 28. It will be noted that the armature flux indicated by full lines, by its demagnetizing effect, discourages the entrance of field flux into the area designated 57 and renders the adjacent bridge path 26 preferable for the return of field flux. Furthermore, in the very center of the pole piece 22 at the area designated 58 armature flux has served to bring about saturation and to thus discourage the entrance of field flux. Further to the right in the area of the enlarged gap 28 reluctance is so high as to discourage entrance of any flux and the adjacent bridge path 26 becomes the preferable path.

The enlarged air gaps 28 and 29 not only cooperate to bring about a reduction of field flux entering the armature, but they also serve the very useful purpose of limiting the extent to which the resultant field is displaced by armature reaction. Because of this, a much wider zone exists or may be created by commutation interpoles within which brushes may be located without undesirably poor commutation. It is possible, therefore, to provide a means for effectively and steplessly varying the maximum current output of which the generator 20 is capable. It has been found that with the apparatus of this invention, maximum current may be varied within a scope of as much as one hundred per cent without producing poor commutation by the simple expedient of shifting of brushes as indicated in Fig. 1 by the arrows extending from the brushes 17 and 18 when commutating interpoles of well-known construction are employed. Not only may the maximum current output be thus widely varied, but such shifting of the brushes produces little or no change in the maximum power output of which the transmission is capable. This follows since maximum power output occurs when motor 1 is operated at maximum product of speed and torque when the current delivered by generator 20 is but a small fraction of the maximum current which it can deliver. Consequently, armature reaction is but moderate under such conditions and the shifting of brushes alters the relationship of field and armature but little.

The transmission shown in Figs. 1 to 6 inclusive is of simplified form to aid in explaining the principles of this invention. It is preferred, however, in practical use to employ a somewhat more elaborate form of the transmission as set forth in Fig. 7 wherein a four-pole generator is employed and wherein successive connection of the field windings thereof may be relied upon to make possible a step-wise, graduated initiation and termination of power transmitted thru the transmission. Referring now specifically to Fig. 7, a conventionally-shown motor 59 having its own separately excited field 60 is joined by power leads 60 and 61 with a generator 62. Generator 62 is provided with an armature 63 and commutator 64 which is engaged by brushes 65 appropriately joined thru interpole windings 66 with the power leads 60 and 61. Generator 62 is also furnished with four pole pieces 67 of the same general configuration as shown in Figs. 2 to 5 and which are capable of functioning in the manner described in connection therewith.

Surrounding the exterior of the pole pieces 67 are self-excited field windings 68, 69, 70 and 71, one end of each of which is connected by the conductor 72 and the field resistor 73 with the terminal of generator 62 to which power lead 61 is joined. The free end of winding 68 is connected by conductor 74 with stationary contact 75 of a commutator type controller 76. In like manner, the free ends of windings 69, 70 and 71 are connected by conductors 77, 78 and 79 with stationary contacts 80, 81 and 82 respectively. The opposite terminal of the generator 62 is connected by conductor 83 with the four stationary terminals 84, 85, and 87 of controller 76. Permanently connected between the conductor 83 and the conductors 74, 77, 78 and 79, are high resistance discharge resistors 88 disposed as shown, which serve to soften the deceleration exhibited by the transmission when transmission of power is discontinued or reversed.

Situated within the pole pieces 67 and surrounding the central portion thereof only are separately excited field windings 89, 90, 91 and 92. Windings 89 and 92 are connected by conductor 93 to operate as a pair of opposite polarity and the free end of winding 89 is electrically joined by the conductor 94 with the stationary contact 95 of controller 76, while the free end of winding 92 is connected by conductor 96 with stationary contact 97. Windings 90 and 91 are likewise connected in a pair by the conductor 98 and the free end of winding 91 is connected by conductor 99 with stationary contact 100 while the free end of winding 90 is connected by conductor 101 with stationary contact 102.

A constant source of separate excitation current is supplied thru leads 103 and 104, one being connected thru conductor 105 with stationary contacts 106 and 107, while the other is connected by conductor 108 with stationary contacts 109 and 110. The field 60 of motor 59 also is excited by connection with leads 103 and 104.

The controller 76 is provided with a plurality of movable commutator segments of graduated length disposed and connected with one another as shown in a manner well known in the art so that upon shifting in either forward or reverse directions the following sequence of events occurs:

1. Contacts 102, 106, 109 and 100 engaged, windings 90 and 91 excited.
2. Contacts 97, 107, 110 and 95 additionally engaged, windings 90, 91, 92 and 89 excited.
3. Contacts 84, 85, 75 and 82 are additionally engaged and windings 89, 90, 91, 92, 68 and 71 are excited.
4. Contacts 86, 87, 81 and 82 are additionally engaged and windings 89, 90, 91, 92, 68, 69, 70 and 71 are all excited.

In this way there is provided not only a measure of speed control but also a means for relieving the abruptness of starting, stopping and plugging, since a substantial amount of time is required to shift the controller 76. If variation of speed control in smaller step than those provided in the systems illustrated in Fig. 7 is desired, additional segments and contacts on the controller 76, together with appropriate field resistors, can be provided in well-known manner.

The advantage of moderate field current demand, which is characteristic of the system of this invention, makes feasible the use of an ordinary small size drum controller such as is designated 76 in Fig. 7. The real advantage of the transmission of this invention in this respect is best demonstrated by comparison with the most nearly comparable transmission heretofore in use. As an instance, two transmissions, each capable as nearly as possible of transmitting the same peak power at about the same speed and of exerting the same maximum torque when stalled were constructed. Maximum armature current of both of these was 800 amp. One of these transmissions employed the old well-known differential series, self-excited shunt and, separately excited field generator. The other was constructed in accordance with this invention. The following is a comparison of the field constructions necessary in the generators of the two transmissions:

|  | Old Transmission | Transmission of this Invention |
|---|---|---|
| Per pole | | |
| Differential series turns | 7½ | 0 |
| Max. differential series current | 800 amp. | 0 amp. |
| Max. differential series amp. turns | −6000 | 0 |
| Separate field turns | 350 | 1200 |
| Separate field current | 19 amp. | 0.59 amp. |
| Separate field amp. turns | +6600 | 684 |
| Self field turns | 600 | 3200 |
| Self field current | 5 amp. | 1.0 amp. |
| Self field amp. turns | 3000 | 3200 |

It may be observed that with the transmission of this invention no current in excess of 1 amp. need be interrupted or controlled in order to stop, start or reverse the transmission even tho in the particular instance given, power in excess of 100 H. P. may at times be involved. This is in contrast with the transmission representative of that heretofore in use, where currents as high as 19 amp. must be interrupted. The need therefor for elaborate switching equipment or separate rotating exciters for each field (whose field is in turn regulated by switching arrangements) is entirely dispensed with.

I claim as my invention:

1. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main central field pole portion, a pole face portion and a flux return path portion the latter being spaced from and extending parallel to said main central pole piece portion from said pole face portion to said frame said pole face portion being spaced from said armature by an air gap and extending therefrom outwardly radially to uninterrupted magnetic juncture with said main and return path portions to provide a continuous unrestricted low reluctance channel between the inner ends of said main and return path portions and between both of them and said air gap; a separately excited winding for each of said pole pieces surrounding said main central pole piece portion and excluding said flux return path portion thereof and adapted to be separately excited by an external source of excitation current; a self-excited winding for each of said pole pieces surrounding both said main central pole piece portion and said flux return path portion thereof and adapted to be excited by current generated by said armature; and brushes engaging said commutator.

2. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main central field pole portion, a pole face portion and a flux return path portion the latter being spaced from and extending parallel to said main central pole piece portion from said pole face portion to said frame, said pole face portion being non-concentric with said armature to provide an increased air gap of greater reluctance on the trailing side thereof said pole face portion extending from said air gap outwardly radially to uninterrupted magnetic juncture with said main and return path portions to provide a continuous unrestricted low reluctance channel between the inner ends of said main and return path portions and between both of them and said air gaps; a separately excited winding for each of said pole pieces surrounding said main central pole piece portion and excluding said flux return path portion thereof and adapted to be excited by an external source of excitation current; a self-excited winding for each of said pole pieces surrounding both said main central pole piece portion and said flux return path portion thereof and adapted to be excited by current generated by said armature; and brushes engaging said commutator.

3. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main central field pole portion, a pole face portion and a flux return path portion the latter being spaced from and extending parallel to said main central pole piece portion from said pole face portion to said frame said pole face portion being spaced from said armature by an air gap and extending therefrom outwardly radially to uninterrupted magnetic juncture with said main and return path portions to provide a continuous unrestricted low reluctance channel between the inner ends of said main and return path portions and between both of them and said air gap; a separately excited winding for each of said pole pieces surrounding said main central pole piece portion and excluding said flux return path portion thereof and adapted to be separately excited by an external source of excitation current; a self-excited winding for each of said pole pieces surrounding both said main central pole piece portion and said flux return path portion thereof and adapted to be excited by current generated by said armature, and angularly adjustable brushes engaging said commutator.

4. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main central field pole portion and a pole face portion and a flux return path portion the latter being spaced from and extending parallel to said main central pole piece portion from said pole face portion to said frame and having a predetermined reluctance greater than that of said main central pole piece portion said pole face portion being spaced from said armature by an air gap and extending therefrom outwardly radially to uninterrupted magnetic juncture with said main and return path portions to provide a continuous unrestricted low reluctance channel between said main and return path portions and between both of them and said air gap; a separately excited winding for each of said pole pieces surrounding said main central pole piece portion and excluding said flux return path portion thereof and adapted to be separately excited by an external source of excitation current; a self-excited winding for each of said pole pieces surrounding both said main central pole piece portion and said flux return path portion thereof and adapted to be excited by current generated by said armature; and brushes engaging said commutator.

5. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main central field pole portion, a pole face portion and a flux return path portion the latter being spaced from and extending parallel to said main central pole piece portion from said pole face portion to said frame said pole face portion being spaced from said armature by an air gap and extending therefrom outwardly radially to uninterrupted magnetic juncture with said main and return path portions to provide a continuous unrestricted low reluctance channel between the inner ends of said main and return path portions and between both of them and said air gap; a separately excited winding for each of said pole pieces surrounding said main central pole piece portion and excluding said flux return path portion thereof and adapted to be excited by an external source of excitation current; a self-excited winding for each of said pole pieces surrounding both said main central pole piece portion and said return flux return path portion thereof and adapted to be excited by current generated by said armature, brushes engaging said commutator; and commutation interpoles and coils adjacent said brushes and between said pole pieces.

6. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main central field pole portion, a pole face portion and a flux return path portion the latter being spaced from said main central pole piece portion and extending from said pole face portion to said frame said pole face portion being spaced from said armature by an air gap and extending therefrom outwardly radially to uninterrupted magnetic juncture with said main and return path portions to provide a continuous unrestricted low reluctance channel between the inner ends of said main and return path portions and between both of them and said air gap; a separately excited winding for each of said pole pieces surrounding said main central pole piece portion and excluding said flux return path portion thereof and adapted to be separately excited by an external source of excitation current; a dependently-excited winding adapted for excitation by current varying in amount dependent upon the voltage of said armature for each of said pole pieces surrounding both said main central pole piece portion and said flux return path portion; and brushes engaging said commutator.

7. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main central field pole portion, a pole face portion and a flux return path portion the latter being spaced from and extending parallel to said main central pole piece portion from said pole face portion to said frame, said pole face portion being non-concentric with said armature to provide an increased air gap of greater reluctance on the trailing side thereof said pole face portion extending from said air gap outwardly radially to uninterrupted magnetic juncture with said main and return path portions to provide a continuous unrestricted low reluctance channel between the inner ends of said main and return path portions and between both of them and said air gaps; a separately excited winding for each of said pole pieces surrounding said main central pole piece portion and excluding said flux return path portion thereof and adapted to be excited by an external source of excitation current; a dependently excited winding adapted for excitation by current varying in amount dependent upon the voltage of said armature for each of said pole pieces surrounding both said main central pole piece portion and said flux return path portion; and brushes engaging said commutator.

8. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main central field pole portion, a pole face portion and a flux return path portion the latter being spaced from and extending parallel to said main central pole piece portion from said pole face portion to said frame, said pole face portion being non-concentric with said armature to provide an increased air gap of greater reluctance on the trailing side thereof said pole face portion extending from said air gap outwardly radially to uninterrupted magnetic juncture with said main and return path portions to provide a continuous unrestricted low reluctance channel between the inner ends of said main and return path portions and between both of them and said air gaps; a separately excited winding for each of said pole pieces surrounding said main central pole piece portion and excluding said flux return path portion thereof and adapted to be excited by an external source of excitation current; a dependently excited winding adapted for excitation by current varying in amount dependent upon the voltage of said armature for each of said pole pieces surrounding both said main central pole piece portion and said flux return path portion; and angularly shiftable brushes engaging said commutator.

9. In a generator adapted to form a part of a power transmitting apparatus including said generator and a motor connected thereto the combination comprising a generator armature and commutator rotatably mounted and adapted to be driven by a source of mechanical power; a field frame having field poles disposed adjacent to said armature in position to cause flux to pass therethru, said field poles each comprising a main pole portion, a pole face portion and a flux return path portion the latter being spaced from said main pole piece portion and extending from said pole face portion to said frame, said pole face portion being non-concentric with said armature to provide an increased air gap of greater reluctance on the trailing side thereof said pole face portion extending from said air gap outwardly radially to uninterrupted magnetic juncture with said main and return path portions to provide a continuous unrestricted low reluctance channel between the inner ends of said main and return path portions and between both of them and said air gaps; a separately-excited winding for each of said pole pieces surrounding said main pole piece portion and excluding said flux return path portion and adapted to be excited by an independent source of excitation current; a dependently excited winding adapted for excitation by current varying in amount dependent upon the voltage of said armature for each of said pole pieces surrounding both said main pole piece portions and said flux return path portion; angularly shiftable brushes engaging said commutator; commutation inter-poles and coils adjacent said brushes and between said pole pieces; and main power leads electrically connected thru said inter-pole coils to said brushes.

HENRY S. JACOBS.

REFERENCES CITED

The following references are of record in the file of this patent:

UNITED STATES PATENTS

| Number | Name | Date |
|---|---|---|
| 1,694,062 | Hansen | Dec. 4, 1928 |
| 1,879,014 | Austin | Sept. 27, 1932 |
| 1,976,782 | Hansen | Oct. 16, 1934 |
| 2,235,075 | Kimball | Mar. 18, 1941 |
| 2,331,257 | Weybrew | Oct. 5, 1943 |

FOREIGN PATENTS

| Number | Country | Date |
|---|---|---|
| 512,350 | Great Britain | Sept. 1, 1939 |